United States Patent
Jen

(10) Patent No.: US 6,630,564 B2
(45) Date of Patent: Oct. 7, 2003

(54) COPOLYESTER WITH IMPROVED EXTRUSION PROCESSING AND COLOR FOR EXTRUSION BLOW MOLDING

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 10/023,880

(22) Filed: Dec. 21, 2001

(65) Prior Publication Data

US 2003/0096942 A1 May 22, 2003

(30) Foreign Application Priority Data

Sep. 26, 2001 (TW) .......................... 90123714

(51) Int. Cl.$^7$ .......................... C08G 63/68; C08K 5/49
(52) U.S. Cl. .......................... 528/287; 528/295; 528/298; 528/300; 528/302; 528/308; 528/308.6; 528/275; 528/296; 524/710; 524/711; 524/713; 428/35.7
(58) Field of Search .......................... 528/287, 275, 528/296, 298, 300, 302, 308, 308.6; 524/710, 711, 713; 428/35.7

(56) References Cited

U.S. PATENT DOCUMENTS

| | | | | |
|---|---|---|---|---|
| 3,558,557 A | * | 1/1971 | Hrach et al. | 528/195 |
| 4,161,579 A | * | 7/1979 | Edelman et al. | 525/444 |
| 4,182,841 A | * | 1/1980 | Hauenstein | 525/437 |
| 4,188,357 A | * | 2/1980 | Go | 264/540 |
| 4,196,275 A | * | 4/1980 | Go | 528/173 |
| 4,219,527 A | * | 8/1980 | Edelman et al. | 264/540 |
| 4,234,708 A | * | 11/1980 | Edelman et al. | 525/444 |
| 4,554,329 A | * | 11/1985 | Sinker et al. | 525/437 |
| 5,182,359 A | * | 1/1993 | Kanaka et al. | 528/193 |
| 5,376,735 A | * | 12/1994 | Sublett | 525/437 |

FOREIGN PATENT DOCUMENTS

| | | | |
|---|---|---|---|
| EP | 0532943 | * | 3/1993 |
| EP | 0774477 | * | 5/1997 |

\* cited by examiner

*Primary Examiner*—Samuel A Acquah
(74) *Attorney, Agent, or Firm*—Bacon & Thomas, PLLC

(57) ABSTRACT

To a copolyester reacted essentially by terephthalic acid components and ethylene glycol units, adding 1% to 15 weight % of specific diol unit selected from the group consisting of at least one of 2-butyl-2-ethyl-1,3-propanediol, 3-methyl-1,5-pentanediol, 2,4-diethyl-1,5-pentanediol and hydroxypivalyl hydroxypivalate; or adding 0 to 1.0 mole % of mulfunctional group components consisting of at least one or more of trimellitic acid, trimellitic anhydride and trimethylol propane; and adding 0.01 to 0.5 weight % of compound represented by the following formula:

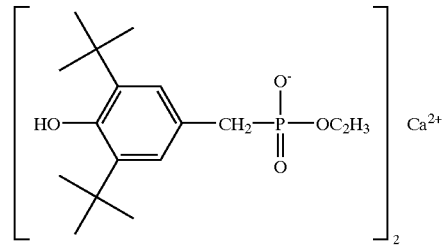

can improve the color hue of the copolyester, and increase the reaction rate of the copolyester subjecting to solid phase polymerization, therefore improve the color hue of the shaped articles produced therefrom; furthermore, reduce the decline degree of the intrinsic viscosity after melt processing.

8 Claims, No Drawings

COPOLYESTER WITH IMPROVED EXTRUSION PROCESSING AND COLOR FOR EXTRUSION BLOW MOLDING

FIELD OF THE INVENTION

The present invention relates to copolyester with improved extrusion processing and color for extrusion blow molding.

1. Background of the Invention

Polyethylene terephthalate (PET) is excellent in various features such as transparency, gas barrier properties, low toxicity of additives, and causing little worries about hygiene and safety with respect to being filled with foodstuff as compared with PVC containers, when molded into hollow shaped articles. The PET has therefore become widely used in food packaging materials.

Two representative processes for producing hollow shaped articles are extrusion blow molding and injection blow molding; in which, the extrusion blow molding process comprises extruding a melt resin with a screw or piston through a die-orifice into a cylindrical hollow parison and, while closing the left mold and the right mold to hold the parison in the mold cavity as it is still softened, quickly blowing the air into the parison; and the injection blow molding process comprises injecting a melted resin into a die to mold a closed parison (preforms) once and, after inserting it into a blow die, blowing the air into the preforms.

Of the above processes, the extrusion blow molding process has the advantage of simple technology, less expensive processing equipment, low cost of die, requiring no complex techniques to replace the die and being capable of producing large and complex-shaped articles, but suffers the disadvantage of slow processing speed; therefore is suitable for multiple-product-small-quantity production. The injection blow molding process is more suitable for large-quantity production, with the features of simple-shaped articles, requiring complex processing techniques, high cost of die and equipment, therefore meeting the requirement of large orders. From the viewpoint of practical application, the above two processes have advantages and disadvantages respectively, therefore the two processing equipment are widely used in present plastic processing industry.

General-purpose polyethylene terephthalate (PET) is molded into various hollow containers by injection blow molding process; when it is molded by extrusion blow molding process, the parisons melt extruded markedly sag (drawdown) and become difficult to be shaped which is caused by low melt viscosity. In addition, crystallization tends to occur on general-purpose PET, with whitening frequently being accompanied, thereby it is incapable of producing acceptable shaped articles especially on producing shaped articles in larger length. Furthermore, shaped articles by extrusion blow molding process has a rather lower draw ratio than the shaped articles by injection blow molding process, therefore having a bad impact resistance.

Taiwan Patent Application No. 88113151 discloses a copolyester suitable for extrusion blow molding processing. The patent application discloses that no severe drawdown of melted parisons occurs on melt extrusion processing, the shaped articles have the advantage of good transparency with excellent color hue, no crystallization whitening occurring and being capable of directly molding into bottle having a capacity of 2.0 liters and amounted with a handle, which features in shock resistance. However, the copolyester produced in this method undergoes a long period of time of solid phase polymerization to reach a sufficiently high degree of viscosity, thus leading to the copolyester being imparted an undesirable yellowish color hue.

The present invention relates to an improved process to the Taiwan Patent Application No. 88113151 which provides a copolyester suitable for extrusion processing with a high productivity and gives the copolyester chip obtained therefrom a better color, therefore leading to improvement to the color of molded articles; furthermore, the improved copolyester can reduce the decline degree of the viscosity of processing residue, ensuring the quality of processing residue even after re-processing.

2. Description of the Prior Art

Prior arts related to the copolyester suitable for extrusion processing are described as following:

1. U.S. Pat. No. 5,182,359, EP-A-0532943, JP-A-5-125165/ 1993 disclose process for producing polyesters suitable for extrusion processing, which comprises adding, on reacting a dicarboxylic acid component or ester-forming derivatives thereof with a diol component containing 2 to 8 carbon atoms, an ethylene oxide adduct of bisphenol A. However, polyesters obtained by the process gives extrusion blow molded articles having insufficient melt viscosity, severe drawdown on melt parisions and failure in molding articles under a stable state; further, surface roughness occurs when molded at a low temperature.

2. U.S. Pat. Nos. 4,161,579, 4,219,527, 4,234,708 disclose process for producing polyester suitable for extrusion blow molding, which comprises adding, on reacting terephthalic acid with ethylene glycol, a crosslinking agent such as trimethylol propane, or pentaerythritol or trimellitic acid, and further adding a chain terminating agent such as benzoic acid or stearic acid. However, crosslinking agent and chain terminating agent employed in the process improve the melt viscosity, but cause quicker crystallization rate as compared with the unmodified polyester, and crystallization whitening occurs on producing shaped articles in larger length. Furthermore, shaped articles produced from said copolyester also exhibits surface roughness as described in above process 1.

3. U.S. Pat. No. 4,182,841, JP-A-55-92730/1980 disclose process for producing polyester suitable for extrusion blow molding, which comprises reacting the terephthalic acid with ethylene glycol to prepare a prepolymer, adding trimethylol propane, or pentaerythritol or trimellitic acid to form copolyester chip and subjecting the copolyester chip to solid phase polymerization. However, the process also displays quicker crystallization rate as described in above process; furthermore, adding isophthalic acid or neopentyl glycol to the process suppresses the crystallization rate, but fails to modify the state of surface roughness due to gel generation resulting from over-crosslinkage.

4. U.S. Pat. No. 4,554,329 discloses a process for producing copolyester suitable for extrusion blow molding, which comprises reacting terephthalic acid, isophthalic acid and ethylene glycol, adding a crosslinking agent such as pentaerythritol, and further adding m-anisic acid. Adding pentaerythritol and m-anisic acid in the process can lead to a sufficient high degree of melt viscosity and rather less gel generation, and adding isophthalic acid can suppress the crystallization rate. However, the slight surface roughness and crystallization whitening still occur on producing shaped articles having a length of at least 30 cm.

5. U.S. Pat. Nos. 3,558,557, 4,188,357, 4,196,275 disclose a process for producing copolyester suitable for extrusion blow molding, which comprises reacting terephthalic acid, ethylene glycol and disphenol A diglycol ether with small amount of multifunctional groups crosslinking agent. However, in this method, the bisphenol A structural modification agent used causes non-crystal phase, therefore increase of molecular weight only depends on melt phase polymerization, thus leading to insufficient high degree of melt viscosity and severe drawdown of melted parisons on producing shaped articles. In order to solve the problem, several methods are proposed which comprise adding substantially disphenol A diglycol ether, which causes extremely long period of time experienced by the polyester subjecting to melt phase polymerization, therefore leading to heat splitting, yellowish color of polyester and failure in proper control to the melt viscosity.

6. EP 0774 477A2 discloses a process for producing copolyester, which comprises adding, on reacting terephthalic acid with ethylene glycol, 1 to 4 mole % of aliphatic or alicyclic bifunctional group component (called a1 unit, such as cyclohexane dimethanol and cyclohexane dicarboxylic acid) or 0.5 to 7 mole % of aromatic diol component (called a2 unit, such as 2,2-bis (4-(2-hydroxyethoxyl)phenyl)propane and 1,4-bis(2-hydroxyethoxyl)benzene) or aromatic dicarboxylic acid component (called a3 unit, such as naphthalene dicarboxylicacid and 4,4-diphenyldicarboxylic acid), and reacting one of above compounds with 0.005 to 1 mole % of compound containing at least trifunctional group (called b1 unit, such as trimethylolpropane, trimellitic anhydride and pentaerythritol), and further reacting with a monofunctional group compound in a specific amount (called c unit, such as benzoic acid, naphthoic acid, trialkoxyphenyl acid, stearic acid, m-anisic acid). Or, adding, on reacting terephthalic acid with ethylene glycol, 0.5 to 7 mole % of bifunctional group compound (called a2 unit, such as 2,2-bis (4-(2-hydroxyethoxyl)phenyl) propane and 1,4-bis(2-hydroxyethoxyl)benzene) and 0.005 to 1 mole % of compound containing at least trifunctional group (called b2 unit, such as trimethylolpropane, trimellitic anhydride and pentaerythritol) to obtain another type of copolyester with specific intrinsic viscosity. Further or, adding, on reacting terephthalic acid with ethylene glycol, 0.5 to 7 mole % of bifunctional group compound (called a3 unit, such as naphthalene dicarboxylicacid and 4,4-diphenyldicarboxylic acid) and 0.005 to 0.5 mole % of compound containing at least trifunctional group (called b1 unit, such as trimethylolpropane, trimellitic anhydride and pentaerythritol) to obtain the other type of copolyester. The above described copolyesters are claimed to be suitable for extrusion blow molding processing.

7. Taiwan Patent No. 307780 discloses a copolyester which comprised adding, on reacting terephthalic acid with ethylene glycol, a triol component such as 2-(4-(2-hydroxyethoxy)phenyl )-2-(3'-(2-hydroxyethyl)-4'-(2-hydroxyethyl) phenyl)propane and/or 1,4-bis(2-hydroxyethoxyl)-2-(2-hydroxyethyl)benzene, in an amount of 0.01 to 1 mol % of the sum of diol component and triol component. The copolyester also can be extrusion blow molded.

Copolyesters described in the process 6 and 7 are applicable to the extrusion processing, and have produced excellent molding shaped articles; however, the aliphatic or alicyclic or aromatic diol component or aromatic dicarboxylic acid used by the processes of the patents should be set below a critical amount, to avoid copolyester chip subjecting to solid phase polymerization to stick together, or in order to avoid stickness, solid phase reaction temperature is decreased leading to a lower reaction rate, thus the impact resistance of the shaped articles is partly suppressed, especially when producing hollow container with larger capacity and complex shape, worries about falling breakage still exist. Further, method exemplified by process 6 refers to producing hollow container with capacity of 1.8 liters, and the method exemplified by process 7 refers to producing hollow container with capacity of 1.0 liters; furthermore, the added modification agent consisting of diol or triol in the process 6 and 7 are mostly of bisphenol A structures, having an adverse effect to the environment and hygiene as compared with the process used by present inventor.

8. U.S. Pat. No. 5,376,735 discloses a process comprising of several steps, on reacting terephthalic acid with ethylene glycol, adding 0.01 to 3 mole % of crosslinking agent consisting one or more of trimellitic acid, trimellitic anhydride, trimesic acid, pentaerythritol or trihydroxypropane to prepare a prepolymer with low molecular weight; grinding the prepolymer to a solid particulate condition; kneading the prepolymer with added 0.1 to 5.0 weight % of isophthalic acid using a Brabender extruder; chipping the prepolymer into copolyester chip and subjecting it to solid phase polymerization, making the molecular weight reaching up to 11,000 to obtain the claimed extrusion blow molding articles. However, practice has proven severe drawdawn of melt parsions still occurs.

9. JP-A-8-337659/1996 relates to adding, on reacting terephthalic acid with ethylene glycol, 0.5 to 50 mole % of diol component represented by the following formula (1)

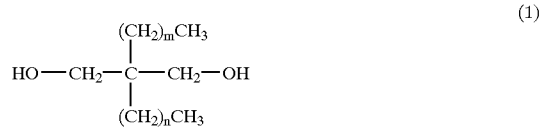

with intrinsic viscosity in a range of 0.5 to 2.00 dl/g. The copolyester chip produced is suitable for bottle by extrusion processing, which has an excellent impact resistance. However, the invention application has not taught how to speed the rate of reaction in solid phase polymerization, and has not implied how to avoid the copolyester chip exhibiting yellowish color hue.

SUMMARY OF THE INVENTION

As a result of an intensive study, the inventor proposes the present invention to improve the drawbacks in Taiwan Patent Application No. 88113151, further improves the extrusion processing and color hue property of the copolyester. Nevertheless, the Taiwan Application No. 88113151 provides a copolyester which comprises the following compounds subjecting to esterification or transesterification:

(1) a dicarboxylic acid component comprising essentially of terephthalic acid or ester forming derivatives thereof, or a small amount of isophthalic acid or 2,6-naphthalene dicarboxylic acid;
(2) a diol unit comprising essentially of ethylene glycol; and
(3) at least one compound selected from the groups consisting:
  (a) 2-butyl-2-ethyl-1,3-propanediol (abbreviated as BEPG), represented by the following formula (2)

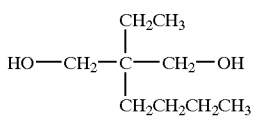
(2)

(b) 3-methyl-1,5-pentanediol (abbreviated as MPG), represented by the following formula (3)

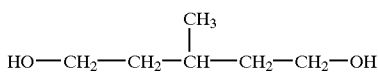
(3)

(c) 2,4-diethyl-1,5-pentanediol (abbreviated as DPG), represented by the following formula (4)

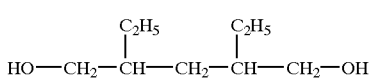
(4)

(d) hydroxypivalyl hydroxypivalate (abbreviated as HPHP), represented by the following formula (5)

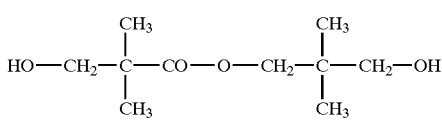
(5)

in an amount of 1% to 15 weight % based on the sum of the weight of total copolyester; and optionally (4) at least one compound as a crosslinking agent selected from the groups consisting:

(a) trimellitic acid, represented by the following formula (6)

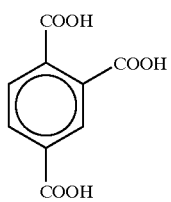
(6)

(b) trimellitic anhydride, represented by the following formula (7)

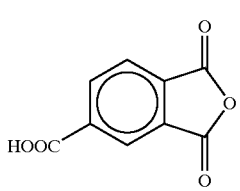
(7)

(c) trimethylol propane, represented by the following formula (8)

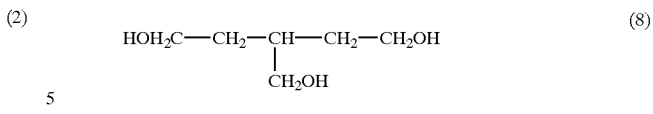
(8)

in an amount of 0 to 1.0 mole % based on the sum of the moles of total copolyester; when the amount is more than 0.25 mole %, the shaped articles of copolyester exhibit marked gelation, whereupon the present invention adds proper benzoic acid in an amount of 0 to 1.0 mole % based on the sum of the moles of total copolyester.

melt condensing the above starting materials to form a polyester prepolymer and subjecting the prepolymer to solid phase polymerization, increasing the intrinsic viscosity to 0.8~1.4 dl/g.

Said copolyester in the Application No. 88113151 has the following characters:

1. The copolyester exhibits non-Newtonian properties, having a low viscosity at high shear rates and a high viscosity at low shear rates, and is hence suitable for extrusion blow molding.
2. The copolyester, having a lower melting point than general injection PET copolyester chip, can be melted at lower temperature, which shortens the processing period and avoids the molding articles to produce joint line.
3. The copolyester, when extrusion blow molded, gives parisons causing no severe drawdown; in particular, when the molded articles having a length of at least 30 cm are molded, the advantage exhibits significantly.
4. The copolyester, having a low crystallization rate, gives the molded articles no crystallization whitening generation, displaying good transparency and excellent gloss hue; in particular, when the molded articles having a length of at least 30 cm are molded, the advantage exhibits significantly.
5. The copolyester gives the molded articles a smooth surface and causing no gel generation resulted from over crosslinkage.
6. The copolyester gives the molded articles a capability to directly produce bottles having a capacity of 2.0 liters with a handle amounted. The bottle features in smooth and transparent appearance, uniform thickness, no gel generation or no unmelted spherulites generation, and good impact resistance.

However, the copolyester, when produced commercially, is limited by the prepolymer produced therefrom, which has a insufficient reaction rate during solid phase polymerization, needing a long period of time to reach sufficient high degree of intrinsic viscosity; in particular, when the intrinsic viscosity is over 1.0 dl/g, it's necessary to decrease the throughput of solid phase polymerization, leading to production cost increased; further, due to long retention time in solid phase polymerization tank, the copolyester chip exhibit yellowish color therefore the molded articles produced therefrom exhibit undesirable yellowish color.

Accordingly, the present invention proposes an improvement to overcome above drawbacks, that is, increasing the reaction rate of the copolyester subjecting to solid phase polymerization, therefore increasing the productivity when produced commercially, and giving the copolyester chip produced therefrom a better color, therefore further improving the surface color of the molded articles; furthermore, the improved copolyester can reduce the decline degree of the viscosity of processing residue, ensuring the quality of processing residue even after re-processing.

The present invention related to adding, on the formula provided by the Taiwan Application No. 88113151, a compound represented by the following formula (9):

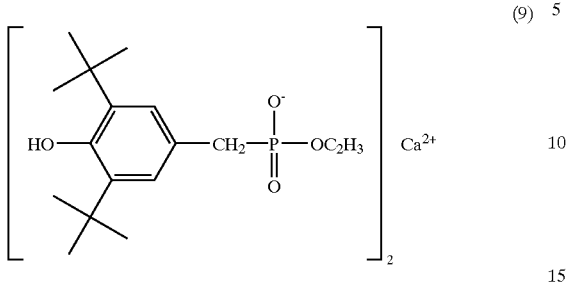
(9)

wherein, the compound is present in an amount of 0.01 to 0.5 weight % based on the sum of the weight of total copolyester, preferably 0.05 to 0.5 weight %, more preferably 0.1 to 0.3 weight %, and the compound is injected during the period that after the slurry preparation stage of bicarboxylic acid and glycol component and before the completion of melt polymerization, preferably injected prior to the completion of esterification.

Compound represented by formula (9) has a suppressed phenol structure, which is capable of acting as a free radical capturing agent in heat splitting reaction, sufficiently decreasing heat splitting of PET; further, the $PO_{-2}$ radical contained by the compound can act as stable agent, resulting the same effect of stable catalyst; furthermore, $Ca^{+2}$ contained by the compound can catalyze the reaction rate of solid phase polymerization at a temperature of below the melting point. Based on above description, the added compound represented by formula (9) can sufficiently suppress the by-reaction at the stage of melt polymerization, producing prepolymer in bluing tint; and, the added compound can increase the rate of solid phase reaction, so that shorten the retention period of copolyester chip staying in the solid phase polymerization tank in order to reach to a desirable intrinsic viscosity, and further improve the color hue of finished copolyester chip, leading to improvement to the color hue of shaped articles exhibiting no yellowish color hue. Another advantage of adding compound represented by formula (9) is reducing the decline degree of intrinsic viscosity of molded articles, which is an extremely important feature in extrusion processing, because when producing molded articles by extrusion processing method, residue is resulted, which needs to be recycled and mixed with fresh copolyester chip in certain proportion to produce molded articles.

Therefore, the present invention conducts the melt polymerization according to the formula comprising:

(1) a dicarboxylic acid component comprising essentially of terephthalic acid or ester forming derivatives thereof, or a small amount of isophthalic acid or 2,6-naphthalene dicarboxylicacid;
(2) a diol unit comprising essentially of ethylene glycol; and
(3) at least one compound selected from the groups consisting:
   (a) 2-butyl-2-ethyl-1,3-propanediol (abbreviated as BEPG), represented by the following formula (2)

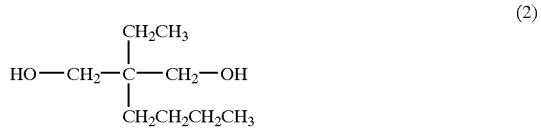
(2)

(b) 3-methyl-1,5-pentanediol (abbreviated as MPG), represented by the following formula (3)

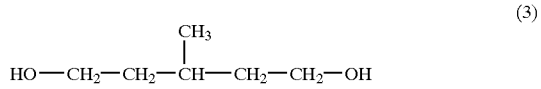
(3)

(c) 2,4-diethyl-1,5-pentanediol (abbreviated as DPG), represented by the following formula (4)

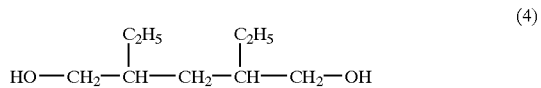
(4)

(d) hydroxypivalyl hydroxypivalate (abbreviated as HPHP), represented by the following formula (5)

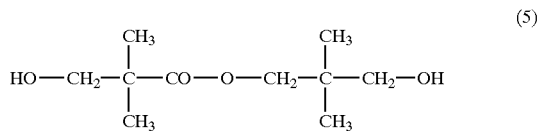
(5)

in an amount of 1% to 15 weight % based on the sum of the weight of total copolyester; and optionally
(4) at least one compound as a crosslinking agent selected from the groups consisting:
   (a) trimellitic acid, represented by the following formula (6)

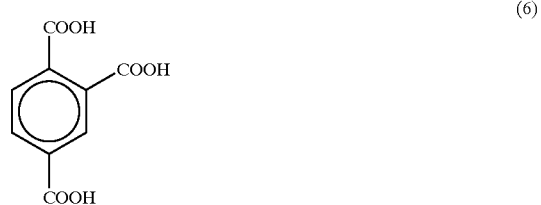
(6)

(b) trimellitic anhydride, represented by the following formula (7)

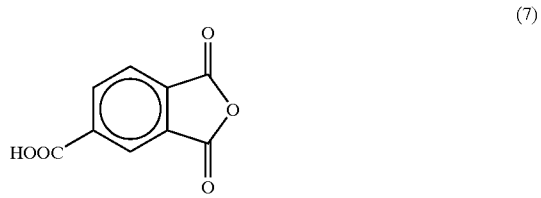
(7)

(c) trimethylol propane, represented by the following formula (8)

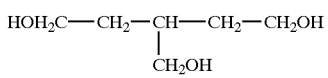

$$\text{HOH}_2\text{C}-\text{CH}_2-\underset{\underset{\text{CH}_2\text{OH}}{|}}{\text{CH}}-\text{CH}_2-\text{CH}_2\text{OH} \quad (8)$$

in an amount of 0 to 1.0 mole % based on the sum of the moles of total copolyester; when the amount is more than 0.25 mole %, the shaped articles of copolyester exhibit marked gelation, whereupon the present invention adds proper benzoic acid in an amount of 0 to 1.0 mole % based on the sum of the moles of total copolyester; and (5) a compound represented by the following formula (9):

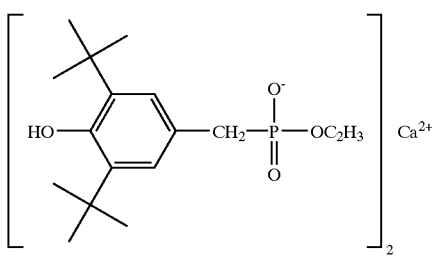

in an amount of 0.01 to 0.5 weight % based on the sum of total weight of copolyester, preferably 0.05 to 0.5 weight %, more preferably 0.1 to 0.3 weight %. When the amount is less than 0.01 weight %, the compound has a less sufficient effect to the increase in solid phase polymerization rate of copolyester, and an unremarkable improvement to color hue; when the amount is more than 0.5 weight %, the compound begins to suppress the reaction rate of melt polymerization and solid phase polymerization, therefore has no improvement effect to the color hue; when the amount is equal to 0.1 weight %, the prepolymer obtained by melt polymerization gives the b-value of color hue suffering a decline of more than 1.5 and the solid phase polymerization rate (rise value of intrinsic viscosity per hour, ΔIV/hr ) suffering a rise of more than 20%, and after solid phase polymerization, the decline of b-value of color hue of finished copolyester chip is more than 2.0 as compared with the color hue the case that no compound represented by the formula (9) is added.
melt condensing the above starting materials to form prepolymer, and subjecting the prepolymer to solid phase polymerization to obtain copolyester chip suitable for extrusion blow molding bottle.

DETAILED DESCRIPTION OF THE PREFERRED EMBODIMENT

The copolester of present invention will be exemplified by following embodiments, but it will be understood that the preferred embodiments are given for illustration of the invention and are not intended to be limiting thereof. In the Examples and Comparative Examples, features of polyester (including copolyester and homopolyester) and effect analysis on molding shaped articles were carried out in accordance with the following methods.

(1) Intrinsic Viscosity of the Polyester (IV):

Determined by measurements on 3:2 by weight mixed solvent of phenol and tetrachloroethane with Ubbelohde viscosimeter at 25° C.

(2) Determination of Color Hue of the Polyester:

The L-value, a-value and b-value are analyzed by the color difference meter of Type ND 300A made by Nippon Denshoku Company (Japan) with Hunter Method.

EXAMPLES

Example 1

(1) A slurry was prepared from 100.00 parts by weight of terephthalic acid, 57.48 parts by weight of ethylene glycol, 7.29 parts by weight of 2-butyl-2-ethyl-1,3-propanediol (abbreviated as BEPG and represented by the formula (2)), 0.0615 parts by weight of compound represented by the formula (9) (in an amount of 0.05 weight % based on the sum of the total copolyester). To the slurry, 0.04 parts by weight of antimony acetate, 0.01 parts by weight of cobalt acetate and 0.01 part by weight of phosphorus acid were added. The resulting slurry was heated under pressure (absolute pressure: 1.0 kgf/cm²), to a temperature of 260° C., to conduct esterification to an esterification ratio of 95% above; then the reaction vessel was vacuumed to a pressure of 1 mm Hg below, and a temperature of 270° C., to conduct first stage polycondensation, and conduct the second stage polycondensation under a lower reduced pressure and at a higher temperature of 280° C. to yield a prepolymer.

The prepolymer was cut into cylindrical chips. In order to fix the time of polymerization, the intrinsic viscosity of the prepolymer was set in the range of 0.63 to 0.65 dl/g.

The copolyester chips thus obtained were placed into a rotary double-coned drying tank, after being dried and crystallized at a temperature of less than 180° C. for 6 hours, subjected to solid phase polymerization under a reduced pressure of 1.5 mm Hg at 215° C. for 30 hours, to yield a finished copolyester.

The copolyester was extrusion blow molded through an extrusion blow molding machine into bottles which have designed capacity of 2,000 ml and can be blow molded into shaped articles with handles.

Example 2–4

Example 1 was repeated except that the adding amount of the compound represented by the formula (9) was 0.123 parts by weight, 0.369 parts by weight and 0.615 parts by weight (0.1 weight %, 0.3 weight % and 0.5 weight % based on the sum of the weight of total copolyester) respectively.

Comparative Example 1

Example 1 was repeated except that no compound represented by formula (9) was added.

Results of above experiments are shown in Table 1.

| | Examples Items | | | | |
|---|---|---|---|---|---|
| | Example 1 | Example 2 | Example 3 | Example 4 | Comparative Example 1 |
| Adding amount of formula (9) | 0.05 wt % | 0.1 wt % | 0.3 wt % | 0.5 wt % | 0 wt % |
| Melt polymerization time (min.) | 113 | 112 | 110 | 118 | 108 |
| color hue of prepolymer (b-value) | 1.43 | 0.35 | −2.31 | −2.47 | 1.91 |
| IV of prepolymer (dl/g) | 0.649 | 0.649 | 0.657 | 0.646 | 0.635 |
| color hue after solid phase polymerization(b-value) | 3.95 | 2.82 | −0.50 | −0.43 | 4.95 |
| IV after solid phase polymerization (dl/g) | 0.943 | 0.985 | 1.021 | 1.030 | 0.886 |
| solid phase polymerization rate ($\Delta$IV/hr) | 0.009800 | 0.01120 | 0.01213 | 0.0128 | 0.008367 |
| IV after melt extrusion (dl/g) | 0.931* | 0.945 | 0.994 | 0.992 | 0.920** |
| Decreased IV after melt extrusion | 0.099 | 0.04 | 0.027 | 0.038 | 0.09 |

*Furthermore, after 10 hours of solid phase polymerization, till IV reached 1.03, then undergo extrusion processing.
**Furthermore, after 15 hours of solid phase polymerization, till IV reached 1.01, then undergo extrusion processing.

What is claimed is:

1. A copolyester suitable for extrusion processing, comprising:

(1) a dicarboxylic acid component comprising terephthalic acid, or ester forming derivatives;

(2) a diol unit comprising ethylene glycol; and (3) at least one compound selected from the groups consisting of:

(a) 2-butyl-2-ethyl-1,3-propanediol (abbreviated as BEPG), represented by the following formula (2)

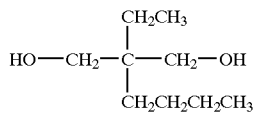

(2)

(b) 3-methyl-1,5-pentanediol (abbreviated as MPG), represented by the following formula (3)

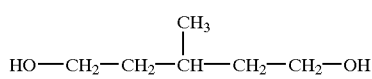

(3)

(c) 2,4-diethyl-1,5-pentanediol (abbreviated as DPG), represented by the following formula (4)

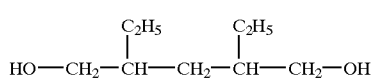

(4)

(d) hydroxypivalyl hydroxypivalate (abbreviated as HPHP), represented by the following formula (5)

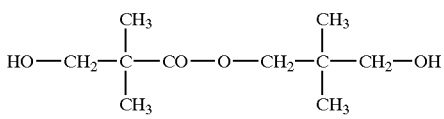

(5)

in an amount of 1% to 15 weight % based on the sum of the weight of total copolyester; and optionally (4) at least one compound as a crosslinking agent selected from the groups consisting of:

(a) trimellitic acid, represented by the following formula (6)

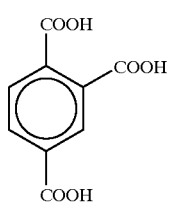

(6)

(b) trimellitic anhydride, represented by the following formula (7)

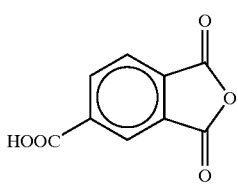

(7)

(c) trimethylol propane, represented by the following formula (8)

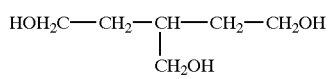
(8)

in an amount of 0 to 1.0 mole % based on the sum of the moles of total copolyester; characterized in said copolyester further comprising:

(5) a compound, represented by the following formula (9)

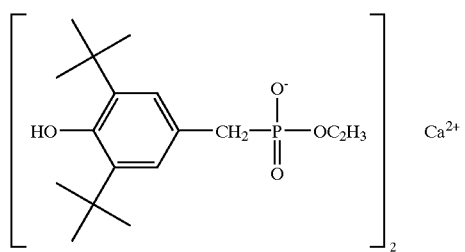
(9)

in an amount of 0.01% to 0.5 weight % based on the sum of the weight of total copolyester; after melt polymerization and solid phase polymerization, said copolyesters have an intrinisic viscosity in a range of 0.8 to 1.4 dl/g.

2. The copolyester suitable for extrusion processing according to claim 1, wherein said compound represented by formula (9) is present in an amount of 0.05% to 0.5 weight %.

3. The copolyester suitable or extrusion processing according to claim 2, wherein said compound represented by formula (9) is present in an amount of 0.1% to 0.3 weight %.

4. The copolyester suitable for extrusion processing according to claim 1, wherein said compound selected from one or more than one selected from compounds represented by formula (2) to formula (5) is present in an amount of 1% to 10 weight % based on the sum of the weight of total copolyester.

5. The copolyester suitable for extrusion processing according to claim 1, wherein said compound selected from one or more than one selected from compounds represented by formula (6) to formula (8) is present in an amount of 0 to 0.25 mole % based on the sum of the moles of total copolyester.

6. The copolyester suitable for extrusion processing according to claim 1, further added either isophthalic acid or naphthalene dicarboxylicacid is present in an amount of not more than 10 more % based on the sum of the moles of total copolyester.

7. The copolyester suitable for extrusion processing according to claim 1, which is used in molding article by extrusion processing.

8. The copolyester suitable for extrusion processing according to claim 1, which is used in shaping a hollow article by extrusion blow molding.

* * * * *